US012590583B2

(12) United States Patent (10) Patent No.: US 12,590,583 B2

Sato et al. (45) Date of Patent: Mar. 31, 2026

(54) SCROLL COMPRESSOR

(71) Applicant: SANDEN CORPORATION, Gunma (JP)

(72) Inventors: Taizo Sato, Gunma (JP); Misako Kaburagi, Gunma (JP); Hitoshi Akuzawa, Gunma (JP); Eiichi Oshio, Gunma (JP); Kyoshiro Nishiyama, Gunma (JP)

(73) Assignee: SANDEN CORPORATION, Gunma (JP)

( * ) Notice: Subject to any disclaimer, the term of this patent is extended or adjusted under 35 U.S.C. 154(b) by 0 days.

(21) Appl. No.: 18/874,105

(22) PCT Filed: Jul. 27, 2023

(86) PCT No.: PCT/JP2023/027529
§ 371 (c)(1),
(2) Date: Dec. 12, 2024

(87) PCT Pub. No.: WO2024/042984
PCT Pub. Date: Feb. 29, 2024

(65) Prior Publication Data
US 2025/0354550 A1      Nov. 20, 2025

(30) Foreign Application Priority Data

Aug. 24, 2022    (JP) ................................. 2022-133103

(51) Int. Cl.
*F04C 15/00* (2006.01)
*F04C 2/02* (2006.01)
*F16C 19/06* (2006.01)

(52) U.S. Cl.
CPC .......... *F04C 15/0038* (2013.01); *F04C 2/025* (2013.01); *F16C 19/06* (2013.01);
(Continued)

(58) Field of Classification Search
CPC .. F04C 15/0038; F04C 2/025; F04C 2240/30; F04C 2240/50; F16C 19/06; F16C 2360/00
See application file for complete search history.

(56) References Cited

U.S. PATENT DOCUMENTS 9,644,628 B2 *   5/2017   Yamashita ............ F04C 29/023
2009/0304539 A1 *  12/2009  Kii ........................ F04C 23/008
418/55.6

(Continued)

FOREIGN PATENT DOCUMENTS

JP      H10-238482 A      9/1998
JP      2000-297757 A     10/2000
(Continued)

OTHER PUBLICATIONS

International Search Report dated Oct. 17, 2023 filed in PCT/JP2023/027529.

*Primary Examiner* — Jesse S Bogue

(74) *Attorney, Agent, or Firm* — Rankin, Hill & Clark LLP

(57)      ABSTRACT

There is provided a scroll compressor capable of stopping breakage even when a rear bearing supporting a shaft has an outer diameter dimension larger than an outer diameter dimension of a shaft seal. The scroll compressor includes a rear bearing 18 press-fitted and fixed to the center casing 6 to support the shaft 14, and a shaft seal 58 disposed on the through hole 17 side of the rear bearing 18. A movable scroll 22 is revolved with respect to the fixed scroll 21. The rear bearing 18 has an outer diameter dimension larger than that of the shaft seal 58, and the shaft seal 58 has a separate structure from the rear bearing 18. Between the rear bearing 18 and the shaft seal 58, a shaft seal fixing plate 64 having a diameter larger than that of the shaft seal 58 is interposed.

3 Claims, 2 Drawing Sheets

(52) U.S. Cl.
CPC ...... *F04C 2240/30* (2013.01); *F04C 2240/50*
(2013.01); *F16C 2360/00* (2013.01)

(56) References Cited

U.S. PATENT DOCUMENTS

| | | | | |
|---|---|---|---|---|
| 2013/0209305 A1* | 8/2013 | Takei | .................. | F04C 18/0253 |
| | | | | 418/55.3 |
| 2019/0309749 A1* | 10/2019 | Yoo | ..................... | F04C 18/0284 |
| 2020/0032795 A1* | 1/2020 | Kim | ...................... | F04C 23/008 |
| 2020/0212760 A1* | 7/2020 | Hattori | .................. | F04D 29/266 |

FOREIGN PATENT DOCUMENTS

| | | |
|---|---|---|
| JP | 2019-023440 A | 2/2019 |
| JP | 2020-105933 A | 7/2020 |

* cited by examiner

SCROLL COMPRESSOR

TECHNICAL FIELD

The present invention relates to a scroll compressor that revolves a movable scroll with respect to a fixed scroll.

BACKGROUND ART

Conventionally, for example, a scroll compressor constituting a refrigerant circuit of a vehicle air conditioner includes a compression mechanism including a fixed scroll having a spiral wrap on a surface of an end plate and a movable scroll having a spiral wrap on a surface of the end plate. The scroll compressor is configured such that a compression chamber is formed between the wraps by making the wraps of the respective scrolls face each other, and the movable scroll is revolved around the fixed scroll by a shaft of a motor to compress working fluid (refrigerant and lubricating oil) in the compression chamber.

In this case, a back pressure chamber that presses the movable scroll against the fixed scroll against the compression reaction force from the compression chamber is formed in a casing referred to as a center casing on the back side of the end plate of the movable scroll. In addition, the shaft is provided to penetrate the through hole of the center casing, and is rotatably supported by a bearing referred to as a rear bearing press-fitted and fixed in the center casing.

In the center casing, a shaft seal that stopping the working fluid from flowing out of the through hole is provided, and the shaft seal is disposed so as to slidably abut on the shaft (for the shaft seal, see, for example, Patent Literature 1.).

CITATION LIST

Patent Literature

Patent Literature 1: JP-A-2000-297757

SUMMARY OF INVENTION

Problems to be Solved by Invention

In recent years, it has been necessary to expand the operation range of the scroll compressor, and it has become important to increase the size of the rear bearing that supports the shaft. In that case, the rear bearing has an outer diameter dimension larger than that of the shaft seal. In the background art, there is no problem since the rear bearing and the shaft seal are integrated. However, in the case in which the rear bearing and the shaft seal have separate structures, when the rear bearing has an outer diameter dimension larger than that of the shaft seal, there is a problem that the end surface of the shaft seal comes into contact with a ball or the like interposed between the outer ring portion and the inner ring portion of the rear bearing, and the rear bearing and the shaft seal are damaged.

The present invention has been made to solve the problems of the background art, and an object of the present invention is to provide a scroll compressor capable of stopping breakage of a bearing supporting a shaft even when the bearing has an outer diameter dimension larger than an outer diameter dimension of a shaft seal.

Solution to Problems

In order to solve the above problems, a scroll compressor according to the present invention includes: a compression mechanism including a fixed scroll and a movable scroll; a casing; a back pressure chamber formed between the casing and the movable scroll; a shaft that penetrates a through hole of a recess formed in the casing and drives the movable scroll; a bearing that is press-fitted and fixed to the recess of the casing and rotatably supports the shaft; and a shaft seal that is disposed in the recess on a side of the through hole of the bearing and stops a working fluid from flowing out of the casing. The movable scroll is revolved with respect to the fixed scroll by a motor to which the shaft is attached to compress the working fluid. The bearing has an outer diameter dimension larger than that of the shaft seal. The shaft seal has a structure separate from the bearing, and the recess between the bearing and the shaft seal has a shaft seal fixing plate having a diameter larger than that of the shaft seal interposed.

A scroll compressor according to a second aspect of the present invention includes: a thrust plate provided on a back pressure chamber side of a movable scroll; and at least a pair of positioning pins that positions the thrust plate with respect to a casing, in which an outer diameter dimension of a bearing is smaller than a distance between the positioning pins.

A scroll compressor according to a third aspect of the invention is the scroll compressor according to the first aspect of the invention, in which the recess of the casing has a step shape including a small-diameter recess and a large-diameter recess, the through hole is formed in the small-diameter recess, the shaft seal is disposed in the small-diameter recess, the bearing is press-fitted and fixed to the large-diameter recess, and the shaft seal fixing plate is disposed in the large-diameter recess between the bearing and the shaft seal.

A scroll compressor according to a fourth aspect of the present invention is the scroll compressor according to the fourth aspect of the present invention, in which the motor includes a balance weight located on a casing side, and an outer shape of the casing is a step shape along a step shape of the recess.

A scroll compressor according to a fifth aspect of the invention is the scroll compressor according to the third or fourth aspect of the invention, in which the bearing is a ball bearing in which a ball is provided between an outer ring portion and an inner ring portion, an outer diameter dimension of the bearing is larger than a distance between at least a pair of rotation stopping pins of the movable scroll provided on the thrust plate, and the shaft seal fixing plate has an outer diameter dimension substantially equal to the outer diameter dimension of the bearing, and the shaft seal fixing plate is sandwiched between an inner surface of the large-diameter recess and the outer ring portion and the inner ring portion of the bearing.

Effects of Invention

According to the present invention, a scroll compressor includes: a compression mechanism including a fixed scroll and a movable scroll; a casing; a back pressure chamber configured between the casing and the movable scroll; a shaft that penetrates a through hole of a recess formed in the casing and drives the movable scroll; a bearing that is press-fitted and fixed to the recess of the casing and rotatably supports the shaft; and a shaft seal that is disposed in the recess on a side of the through hole of the bearing and stops working fluid from flowing out of the casing, in which working fluid is compressed by causing a motor to which the shaft is attached to revolve the movable scroll with respect to the fixed scroll. In the scroll compressor, a shaft seal fixing plate having a larger outer diameter dimension than the shaft seal is interposed between the bearing and the shaft seal, so that it is possible to eliminate the disadvantage that the shaft seal comes into contact with the ball of the bearing and the bearing or the shaft seal is damaged.

As a result, it is possible to avoid inconvenience that the working fluid flows out of the casing, and it is possible to solve deterioration in performance of the scroll compressor. In addition, since it is possible to cope with an increase in size of the bearing, it is possible to extend the life even when the operation range of the scroll compressor is expanded. Furthermore, because of the relatively simple configuration in which the shaft seal fixing plate is interposed between the bearing and the shaft seal, an increase in cost can be minimized.

Moreover, since the shaft seal is not increased in size, the expansion of the overall dimensions of the scroll compressor due to the extension of the shaft or the like is eliminated, the risk of interference with the balance weight attached to the motor as in one embodiment of the present application is also suppressed, and it is possible to eliminate the disadvantage of deterioration of vibration noise.

In addition, as in one embodiment of the present application, the thrust plate provided on the back pressure chamber side of the movable scroll and at least the pair of positioning pins that positions the thrust plate with respect to the casing are provided, and the outer diameter dimension of the bearing is made smaller than the distance between the positioning pins, so that it is possible to avoid an increase in the overall dimension of the scroll compressor due to an excessive increase in size of the bearing.

In addition, as in one embodiment of the present application, when the recess of the casing has a step shape including the small-diameter recess and the large-diameter recess, the through hole is formed in the small-diameter recess, the shaft seal is disposed in the small-diameter recess, the bearing is press-fitted and fixed to the large-diameter recess, and the shaft seal fixing plate is disposed in the large-diameter recess between the bearing and the shaft seal, it is made possible to stably hold the shaft seal and the shaft seal fixing plate by the bearing press-fitted and fixed to the casing.

In addition, as in one embodiment of the present application, by forming the outer shape of the casing into a step shape along the step shape of the recess, it is possible to eliminate the disadvantage that the casing interferes with the balance weight located on the casing side of the motor, and it is unnecessary to extend the axial length of the shaft.

Furthermore, as in one embodiment of the present application, when the outer diameter dimension of the bearing is made larger than the distance between at least the pair of rotation stopping pins of the movable scroll provided in the thrust plate, the outer diameter dimension of the shaft seal fixing plate is made substantially equal to the outer diameter dimension of the bearing, and the shaft seal fixing plate is sandwiched between the inner surface of the large-diameter recess and the outer ring portion and the inner ring portion of the bearing, it is possible to more stably hold the shaft seal fixing plate in the casing and reliably stop the interference between the shaft seal and the bearing.

DESCRIPTION OF EMBODIMENTS

Figure 1:
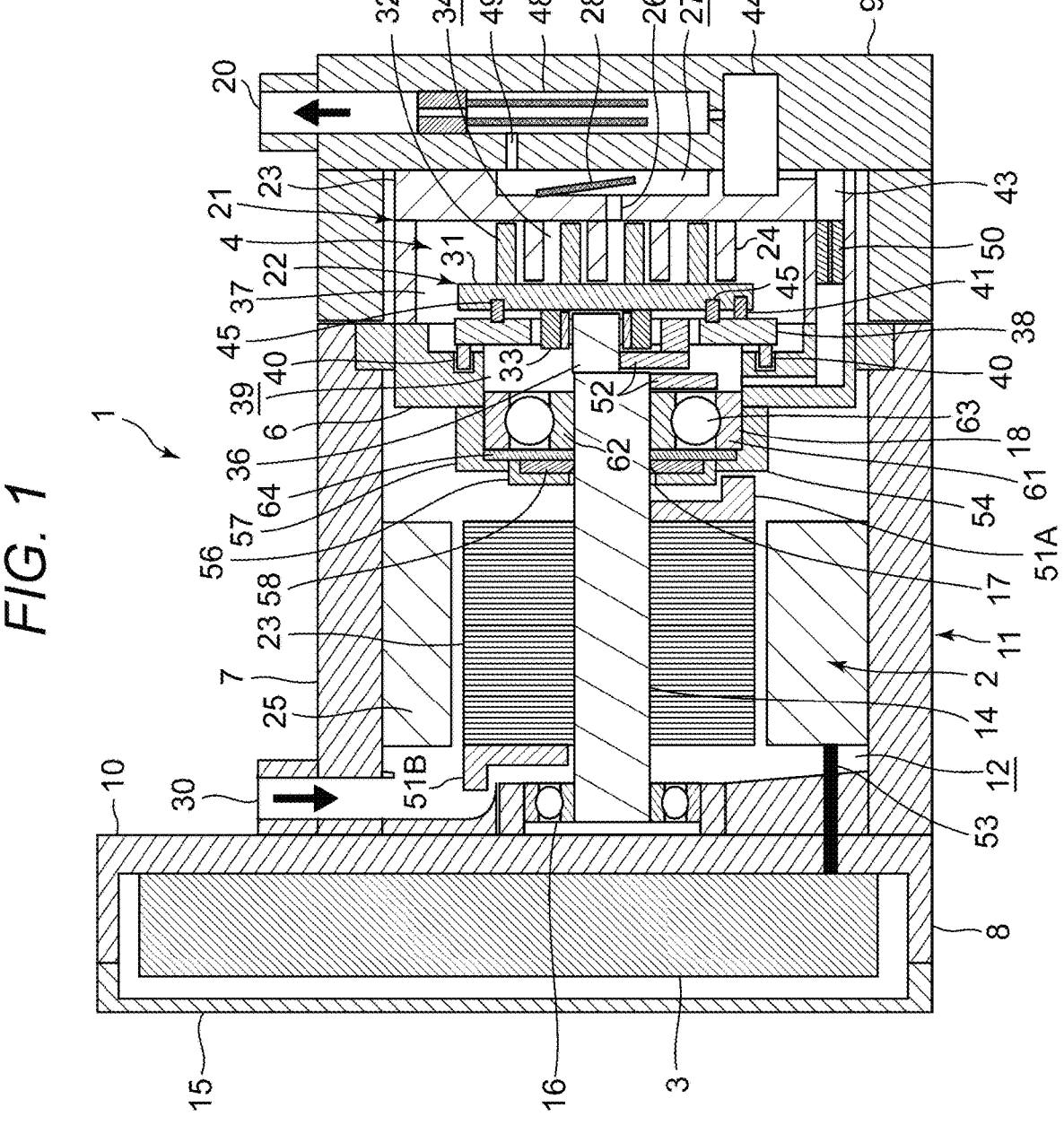
FIG. 1 is a cross-sectional view of a scroll compressor according to an embodiment to which the present invention is applied.

In the following, an embodiment of the present invention is described in detail with reference to the drawings. FIG. 1 is a schematic cross-sectional view of a scroll compressor 1 according to an embodiment to which the present invention is applied.

The scroll compressor 1 according to the embodiment is used, for example, in a refrigerant circuit of an air conditioner for an electric vehicle, and sucks, compresses, and discharges a refrigerant (including lubricating oil) as a working fluid of the air conditioner to a discharge pipe. The scroll compressor 1 is a so-called horizontal scroll compressor including a three-phase motor 2 that is an embodiment of a motor, an inverter 3 that operates the motor 2, and a scroll compression mechanism 4 driven by the motor 2.

The scroll compressor 1 according to an embodiment includes the motor 2, a stator housing 7 that houses a center casing 6 as a casing according to the present invention inside the stator housing 7, an inverter case 8 that is attached to one end side of the stator housing 7 and houses the inverter 3 inside the inverter case 8, and a rear casing 9 that is attached to the other end side of the stator housing 7.

The center casing 6, the stator housing 7, the inverter case 8, and the rear casing 9 are all made of metal (aluminum in the embodiment), and are integrally joined to constitute a housing 11 of the scroll compressor 1 of the embodiment.

A motor chamber 12 that houses the motor 2 is formed in the stator housing 7, and one end face of the motor chamber 12 is closed. The other end face of the motor chamber 12 is opened, and the center casing 6 is housed in the opening after the motor 2 is housed. In addition, a front bearing 16 that rotatably supports one end portion of a shaft 14 attached to the motor 2 is attached to an inner surface (motor chamber 12 side) of a wall on one end side of the stator housing 7.

The center casing 6 has an opening on the side opposite to the motor 2 (the other end side). After the movable scroll 22 of the compression mechanism 4, which will be described later, is housed in the opening, the rear casing 9 to which the fixed scroll 21 of the compression mechanism 4, which will be described later, is fixed is fixed to the stator housing 7 to be closed.

In addition, a through hole 17 through which the other end portion of the shaft 14 of the motor 2 penetrates is opened in the center casing 6, and a rear bearing 18 as a bearing that rotatably supports the other end portion of the shaft 14 on the compression mechanism 4 side is attached in the center casing 6 on the compression mechanism 4 side of the through hole 17.

The motor 2 includes a stator 25 around which a coil is wound and which is fixed to the inner side of the peripheral wall of the stator housing 7, and a rotor 23 that rotates inside the stator 25. For example, a direct current from a battery (not shown) of the vehicle is converted into a three-phase alternating current by the inverter 3 and supplied to a coil of the stator 25 of the motor 2, so that the rotor 23 is rotationally driven. The shaft 14 is attached and fixed to the rotor 23 of the motor 2. A reference sign 51A denotes a balance weight attached to the end face of the rotor 23 of the motor 2 at the position on the center casing 6 side, and a reference sign 51B denotes a balance weight attached to the end face on the opposite side.

In addition, a suction port 30 is formed in the stator housing 7, and a low-temperature refrigerant sucked from the suction port 30 as indicated by an arrow in FIG. 1 penetrates the motor 2 in the stator housing 7, then flows into the center casing 6, and is sucked into the suction portion 37 outside the compression mechanism 4. As a result, the motor 2 is cooled by the suction refrigerant. In addition, the refrigerant compressed by the compression mechanism 4 is discharged from a discharge chamber 27, which will be described later, to a discharge pipe of a refrigerant circuit (not shown) outside the housing 11 as indicated by an arrow in the drawing through a discharge port 20 formed in the rear casing 9.

The compression mechanism 4 includes the fixed scroll 21 and the movable scroll 22 described above. The fixed scroll 21 integrally includes an end plate 23 in a disk shape, and a wrap 24 erected on a surface (one surface) of the end plate 23, the wrap 24 having an involute shape or a spiral shape formed of a curve closer to the involute shape, and is fixed to the rear casing 9 with the surface, on which the wrap 24 is erected, of the end plate 23 facing the center casing 6.

In the center of the end plate 23 of the fixed scroll 21, a discharge hole 26 is formed, and the discharge hole 26 communicates with the discharge chamber 27 in the rear casing 9. In the drawing, a reference sign 28 denotes a discharge valve provided at an opening of the discharge hole 26 on a back (the other surface) side of the end plate 23.

The movable scroll 22 is a scroll that revolves relative to the fixed scroll 21, and integrally includes a disk-shaped end plate 31, a wrap 32 erected on a surface (one surface) of the end plate 31, the wrap 32 having an involute shape or a spiral shape formed of a curve closer to the involute shape, and a boss 33 protruding from the center of a back (the other surface) of the end plate 31. The movable scroll 22 is placed in such a manner that the wrap 32 faces and meshes with the wrap 24 of the fixed scroll 21 with the protruding direction of the wrap 32 facing the fixed scroll 21, and a pressure chamber 34 is formed between the wraps 24 and 32.

That is, the wrap 32 of the movable scroll 22 faces the wrap 24 of the fixed scroll 21, and engages with the surface of the end plate 23 such that the tip of the wrap 32 is in contact with the surface of the end plate, and the tip of the wrap 24 is in contact with the surface of the end plate 31. To the boss 33 of the movable scroll 22, an eccentric portion 36 provided eccentrically from the axis center at the other end of the shaft 14 is fitted. When the shaft 14 is rotated together with the rotor 23 of the motor 2, the movable scroll 22 revolves with respect to the fixed scroll 21 without rotating. Note that a counter weight 52 is attached to the other end of the shaft 14.

Since the movable scroll 22 is eccentric with respect to the fixed scroll 21 and revolves, the eccentric directions and the contact positions of the laps 24 and 32 move while rotating, and the pressure chamber 34 that has sucked the refrigerant (including oil) from the suction portion 37 on the outer side gradually decreases while moving inward. As a result, the refrigerant is compressed and finally discharged from the central discharge hole 26 to the discharge chamber 27 via the discharge valve 28.

In FIG. 1, a reference sign 38 denotes an annular thrust plate. The thrust plate 38 is provided to define the back pressure chamber 39 formed between the back surface of the end plate 31 of the movable scroll 22 and the center casing 6 from the suction portion 37 outside the compression mechanism 4, and the thrust plate 38 is located outside the boss 33 and interposed between the center casing 6 and the movable scroll 22. That is, the thrust plate 38 is provided on the back pressure chamber 39 side of the movable scroll 22.

In addition, a reference sign 40 denotes a positioning pin that positions the thrust plate 38 in the center casing 6, and at least a pair of positioning pins is provided at an end portion of the thrust plate 38. Furthermore, a reference sign 45 denotes a rotation-stopping pin protrudes from the thrust plate 38 toward the movable scroll 22. At least a pair of rotation stopping pins 45 is also provided, and slidably engages with a back surface of end plate 31 of movable scroll 22 is served to stop rotation of movable scroll 22.

Moreover, a seal member 41 is attached to the back surface of the end plate 31 of the movable scroll 22 and abuts on the thrust plate 38, and the back pressure chamber 39 and the suction portion 37 are defined by the seal member 41 and the thrust plate 38. Note that although only one side is shown in the drawings, the actual sealing material 41 has a ring shape and is attached to the rear peripheral portion of the end plate 31.

In addition, a reference sign 48 denotes a centrifugal oil separator provided in the rear casing 9 (housing 11). The oil separator 48 separates lubricating oil mixed in the refrigerant discharged from the compression mechanism 4 to the discharge chamber 27 from the refrigerant. The oil separator 48 is formed with an inflow port 49, and the refrigerant containing the oil, which is flown through the inflow port 49, swirls in the oil separator 48. The oil is separated by the centrifugal force at this time, and the refrigerant flows from the outflow port at the upper end toward the discharge port 20, and is discharged to the discharge pipe as described above.

The rear casing 9 is formed with an oil reservoir chamber 44 below the oil separator 48, and the oil separated from the refrigerant by the oil separator 48 flows into the oil reservoir chamber 44 from a lower end of the oil separator 48. In the drawing, a reference sign 43 denotes a back pressure passage formed from the rear casing 9 to the center casing 6. The back pressure passage 43 is a passage that communicates the oil separator 48 and the back pressure chamber 39 in the discharge chamber 27 (discharge side of the compression mechanism 4) in the rear casing 9, and has an orifice 50 in the embodiment. As a result, the back pressure chamber 39 is configured in such a manner that discharge pressure adjusted and reduced by the orifice 50 of the back pressure passage 43, together with the oil in the oil reservoir chamber 44 separated by the oil separator 48, is supplied to the back pressure chamber 39.

The pressure (back pressure) in the back pressure chamber 39 generates a back pressure load that presses the movable scroll 22 against the fixed scroll 21. Because of this back pressure load, the movable scroll 22 is pressed to the fixed scroll 21 against the compression reaction force from the pressure chamber 34 of the compression mechanism 4, the contact between the wraps 24 and 32 and the end plates 31 and 23 is maintained, and the refrigerant can be compressed in the pressure chamber 34.

On the other hand, the inverter case 8 includes a case body 10 constituting an inverter housing portion 13 in which the inverter 3 is housed, and a lid member 15 that closes an opening of one end face of the case body 10. The lid member 15 is attached to the case body 10 after the inverter 3 is housed in the inverter housing portion 13.

To a wall on one end side of the stator housing 7, a hermetic pin 53 is attached. One end side of the hermetic pin 53 is electrically connected to the inverter 3. In addition, the other end side of the hermetic pin 53 is connected to a coil of the stator 25 of the motor 2.

Next, a detailed structure around the rear bearing 18 will be described with reference to an enlarged view of FIG. 2.

In the center casing 6, a recess 54 recessed to the side opposite to the opening on the other end side, that is, one end side is formed. The recess 54 has a step shape including a small-diameter recess 56 located at one end of the center casing 6 and a large-diameter recess 57 having a diameter larger than that of the small-diameter recess 56, and the through hole 17 described above penetrates the small-diameter recess 56. In addition, the outer shape of the center casing 6 is a step shape along the step shape of the recess 54.

In the small-diameter recess 56, an annular shaft seal 58 is disposed. In this case, the inner depth dimension of the small-diameter recess 56 (dimension in the axial direction of the shaft 14) is substantially equal to the thickness dimension of the shaft seal 58, and the shaft seal 58 is housed in the small-diameter recess 56 with substantially no gap. The shaft seal 58 is disposed on the through hole 17 side of the rear bearing 18, and its inner peripheral edge portion slidably abuts on an outer peripheral surface of the shaft 14 to stop oil and a refrigerant (working fluid) from flowing out from the through hole 17 to the motor chamber 12 outside the center casing 6 (indicated by an arrow in FIG. 2).

On the other hand, the rear bearing 18 described above is press-fitted and fixed in the large-diameter recess 57. The rear bearing 18 is a ball bearing including an outer ring portion 61, an inner ring portion 62, and a plurality of balls 63 provided between the outer ring portion 61 and the inner ring portion 62. The outer surface of the outer ring portion 61 is press-fitted into the inner surface of the large-diameter recess 57, and the shaft 14 is press-fitted into the inner surface of the inner ring portion 62.

The rear bearing 18 used in the present invention has a larger diameter than ones in the background art in order to cope with the expansion of the operation range of the scroll compressor 1, and has an outer diameter dimension larger than that of the shaft seal 58. In the case of the embodiment, the outer diameter dimension of the rear bearing 18 is enlarged to a value larger than the distance between the rotation stopping pins 45 of the thrust plate 38 described above. However, the outer diameter dimension of the rear bearing 18 of the embodiment is set to a value smaller than the distance between the positioning pins 40 of the thrust plate 38. As a result, as shown in FIG. 2, the outer peripheral edge portion of the shaft seal 58 of the embodiment has just come to a position corresponding to the ball 63 between the outer ring portion 61 and the inner ring portion 62 of the rear bearing 18 in the axial direction.

In addition, the rear bearing 18 and the above-described shaft seal 58 have a separate structure, and a predetermined distance is formed in the large-diameter recess 57 on the shaft seal 58 side of the rear bearing 18. The shaft seal fixing plate 64 according to the present invention is disposed within the distance of the large-diameter recess 57 between the rear bearing 18 and the shaft seal 58, and is interposed between the rear bearing 18 and the shaft seal 58.

The shaft seal fixing plate 64 of the embodiment has a larger diameter than the shaft seal 58, and has an outer diameter dimension substantially equal to the outer diameter dimension of the rear bearing 18. The shaft seal fixing plate 64 is sandwiched between the inner surface of the large-diameter recess 57 at the step portion between the large-diameter recess 57 and the small-diameter recess 56 and the outer ring portion 61 and the inner ring portion 62 of the rear bearing 18.

Next, a procedure of attaching the rear bearing 18, the shaft seal 58, and the shaft seal fixing plate 64 will be described. First, the shaft seal 58 is disposed in the small-diameter recess 56 of the recess 54 of the center casing 6.

After that, the shaft seal fixing plate 64 is disposed in the large-diameter recess 57 of the step portion between the large-diameter recess 57 and the small-diameter recess 56. Finally, the rear bearing 18 is press-fitted into the large-diameter recess 57.

Here, when the diameter dimension of the rear bearing 18 is increased, the outer peripheral edge portion of the shaft seal 58 comes to a position corresponding to the ball 63 of the rear bearing 18 as described above. Therefore, without the shaft seal fixing plate 64, the shaft seal 58 having a structure separate from the rear bearing 18 moves in the axial direction, and its outer peripheral edge comes into contact with the balls 63 and the inner ring portion 62 of the rotating rear bearing 18, and the rear bearing 18 and the shaft seal 58 are damaged.

When the rear bearing 18 is damaged, the shaft 14 fails to be smoothly supported, and rotation is hindered. In addition, when the shaft seal 58 is damaged, oil or a refrigerant (working fluid) leaks to the motor chamber 12 having a low pressure outside the center casing 6 as indicated by arrows in FIG. 2, so that the back pressure of the back pressure chamber 39 decreases, the compression mechanism 4 enters a compression failure, and the refrigeration capacity decreases.

However, by disposing the shaft seal fixing plate 64 between the rear bearing 18 and the shaft seal 58 as in the present invention, it is possible to stop the rear bearing 18 and the shaft seal 58 from being damaged by the shaft seal 58 coming into contact with the balls 63 and the inner ring portion 62 of the rear bearing 18 even when the rear bearing 18 has an outer diameter dimension larger than the shaft seal 58 and the shaft seal 58 has a structure separated from the rear bearing 18.

As a result, it is possible to avoid inconvenience that the oil or the refrigerant (working fluid) flows out to the low-pressure motor chamber 12 outside the center casing 6, and it is possible to solve the deterioration in performance of the scroll compressor 1. Since it is possible to cope with the increase in size of the rear bearing 18 without any problem, even when the operation range of the scroll compressor 1 is expanded, the life can be extended.

Furthermore, because of the relatively simple configuration in which the shaft seal fixing plate 64 is interposed between the rear bearing 18 and the shaft seal 58, it is possible to minimize an increase in cost. In addition, since the shaft seal 58 is not increased in size, there is no necessity to extend the shaft 14 or the like in order to stop interference with the balance weight 51A of the motor 2, and it is possible to eliminate an increase in overall dimensions of the scroll compressor 1. That is, it is unnecessary to limit the size of balance weight 51A, and thus, it is possible to eliminate the disadvantage that the vibration noise is deteriorated.

In addition, in the embodiment, the outer diameter dimension of the rear bearing 18 is smaller than the distance between the positioning pins 40 of the thrust plate 38, so that it is possible to avoid an increase in the overall size of the scroll compressor 1 due to an excessive increase in the size of the rear bearing 18.

In addition, in the embodiment, the recess 54 of the center casing 6 has a step shape including the small-diameter recess 56 and the large-diameter recess 57, the through hole 17 is formed in the small-diameter recess 56, the shaft seal 58 is disposed in the small-diameter recess 56, the rear bearing 18 is press-fitted and fixed to the large-diameter recess, and the shaft seal fixing plate 64 is disposed in the large-diameter recess 57 between the rear bearing 18 and the shaft seal 58. In addition, therefore, the shaft seal 58 and the shaft seal fixing plate 64 can be stably held by the rear bearing 18 press-fitted and fixed to the center casing 6.

Figure 2:
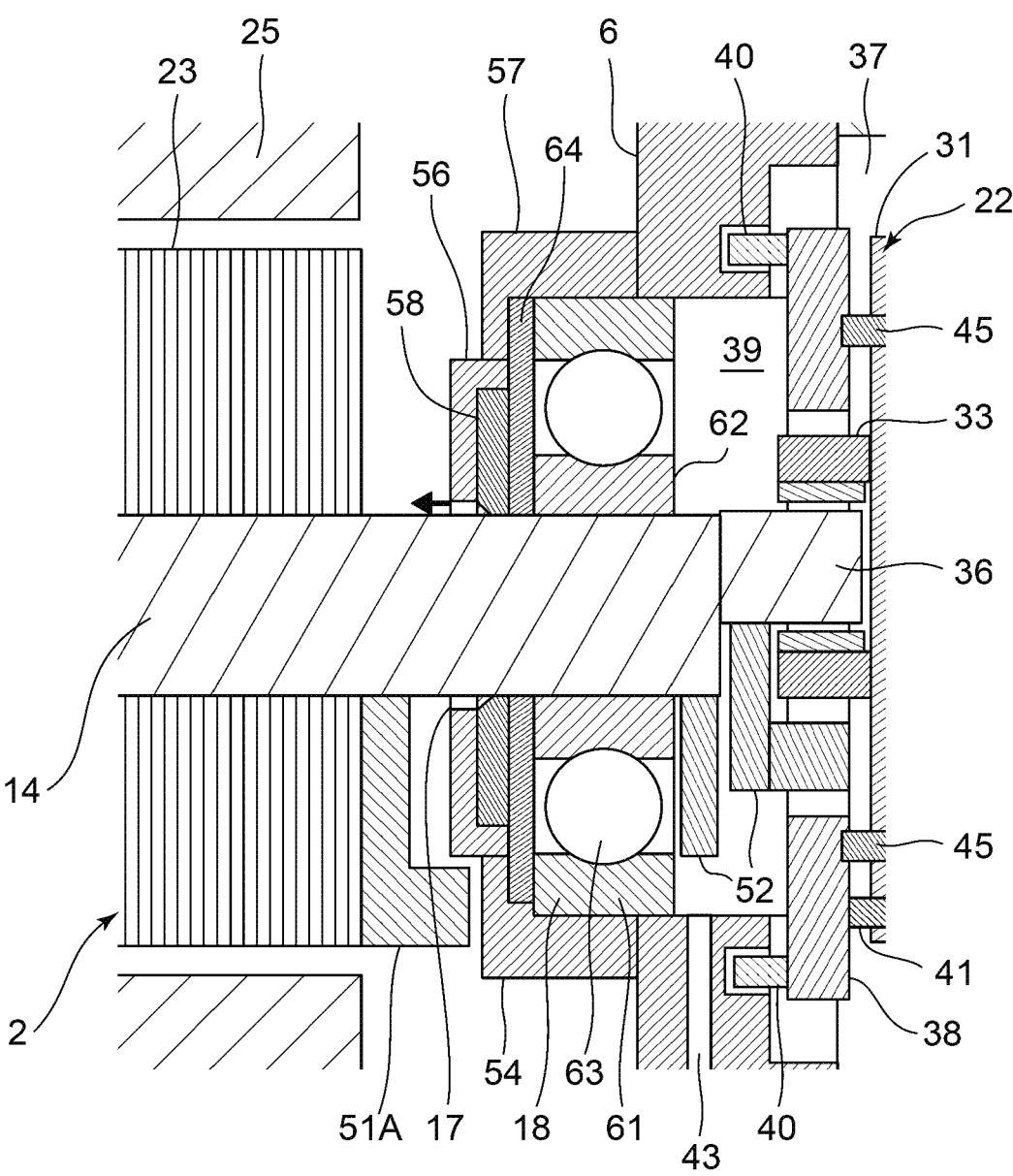
FIG. 2 is an enlarged cross-sectional view of a rear bearing portion of the scroll compressor in FIG. 1.

In addition, in the embodiment, since the outer shape of the center casing 6 is a step shape along the step shape of the recess 54, the small-diameter recess 56 of the center casing 6 is located inside the balance weight 51A of the motor 2 as shown in FIG. 2. As a result, it is possible to eliminate the inconvenience of interference between the center casing 6 and the balance weight 51A, and it is unnecessary to extend the axial length of the shaft 14.

Furthermore, in the embodiment, the outer diameter dimension of the rear bearing 18 is made larger than the distance between the rotation stopping pins 45 of the movable scroll 2 provided in the thrust plate 38, the outer diameter dimension of the shaft seal fixing plate 64 is made substantially equal to the outer diameter dimension of the rear bearing 18, and the shaft seal fixing plate 64 is sandwiched between the inner surface of the large-diameter recess 57 and the outer ring portion 61 and the inner ring portion 62 of the rear bearing 18. Therefore, the shaft seal fixing plate is more stably held in the center casing 6, and it is possible to reliably stop interference between the shaft seal 58 and the rear bearing 18.

Note that in the embodiment, the present invention has been described with the scroll compressor 1 in which the center casing 6 is housed in the housing 11. However, the specific structure of the housing 11 of the scroll compressor 1 is not limited to the embodiment, and it is needless to say that the structure can be changed without departing from the spirit of the present invention.

LIST OF REFERENCE SIGNS

1 Scroll compressor
2 Motor
3 Inverter
4 Compression mechanism
6 Center casing (casing)
7 Stator housing
11 Housing
12 Motor chamber
14 Shaft
17 Through hole
18 Rear bearing (bearing)
21 Fixed scroll
22 Movable scroll
38 Thrust plate
39 Back pressure chamber
40 Positioning pin
45 Rotation stopping pin
51A Balance weight
54 Recess
56 Small-diameter recess
57 Large-diameter recess
58 Shaft seal
61 Outer ring portion
62 Inner ring portion

63 Ball
64 Shaft seal fixing plate

The invention claimed is:

1. A scroll compressor comprising:
a compression mechanism including a fixed scroll and a movable scroll;
a casing;
a back pressure chamber configured between the casing and the movable scroll;
a shaft that penetrates a through hole of a recess formed in the casing and drives the movable scroll, the recess of the casing having a step shape including a small-diameter recess and a large-diameter recess, the through hole being formed in the small-diameter recess;
a bearing that is press-fitted and fixed to the large-diameter recess of the casing and rotatably supports the shaft, the bearing being a ball bearing in which a ball is provided between an outer ring portion and an inner ring portion;
a shaft seal that is disposed in the small-diameter recess on a side of the through hole of the bearing and stops working fluid from flowing out of the casing, in which a motor to which the shaft is attached revolves the movable scroll with respect to the fixed scroll to compress the working fluid; and
a thrust plate provided on the back pressure chamber side of the movable scroll,
wherein the bearing has an outer diameter dimension larger than an outer diameter dimension of the shaft seal,
the outer diameter dimension of the bearing is larger than a distance between at least a pair of rotation stopping pins of the movable scroll provided in the thrust plate,
the shaft seal has a structure separate from the bearing,
a shaft seal fixing plate having a diameter larger than that of the shaft seal is disposed and interposed in the large-diameter recess between the bearing and the shaft seal, and
the shaft seal fixing plate has an outer diameter dimension substantially equal to an outer diameter dimension of the bearing, and the shaft seal fixing plate is sandwiched between an inner surface of the large-diameter recess and the outer ring portion and the inner ring portion of the bearing.

2. The scroll compressor according to claim 1, comprising:
at least a pair of positioning pins that positions the thrust plate with respect to the casing,
wherein an outer diameter dimension of the bearing is smaller than a distance between the positioning pins.

3. The scroll compressor according to claim 1, wherein the motor includes a balance weight located on the casing side, and
an outer shape of the casing has a step shape along a step shape of the recess.

* * * * *